July 28, 1936. R. E. REASON 2,049,223
APPARATUS FOR THE OBJECTIVE DETERMINATION OF THE REFRACTION OF THE EYE
Filed Jan. 14, 1935
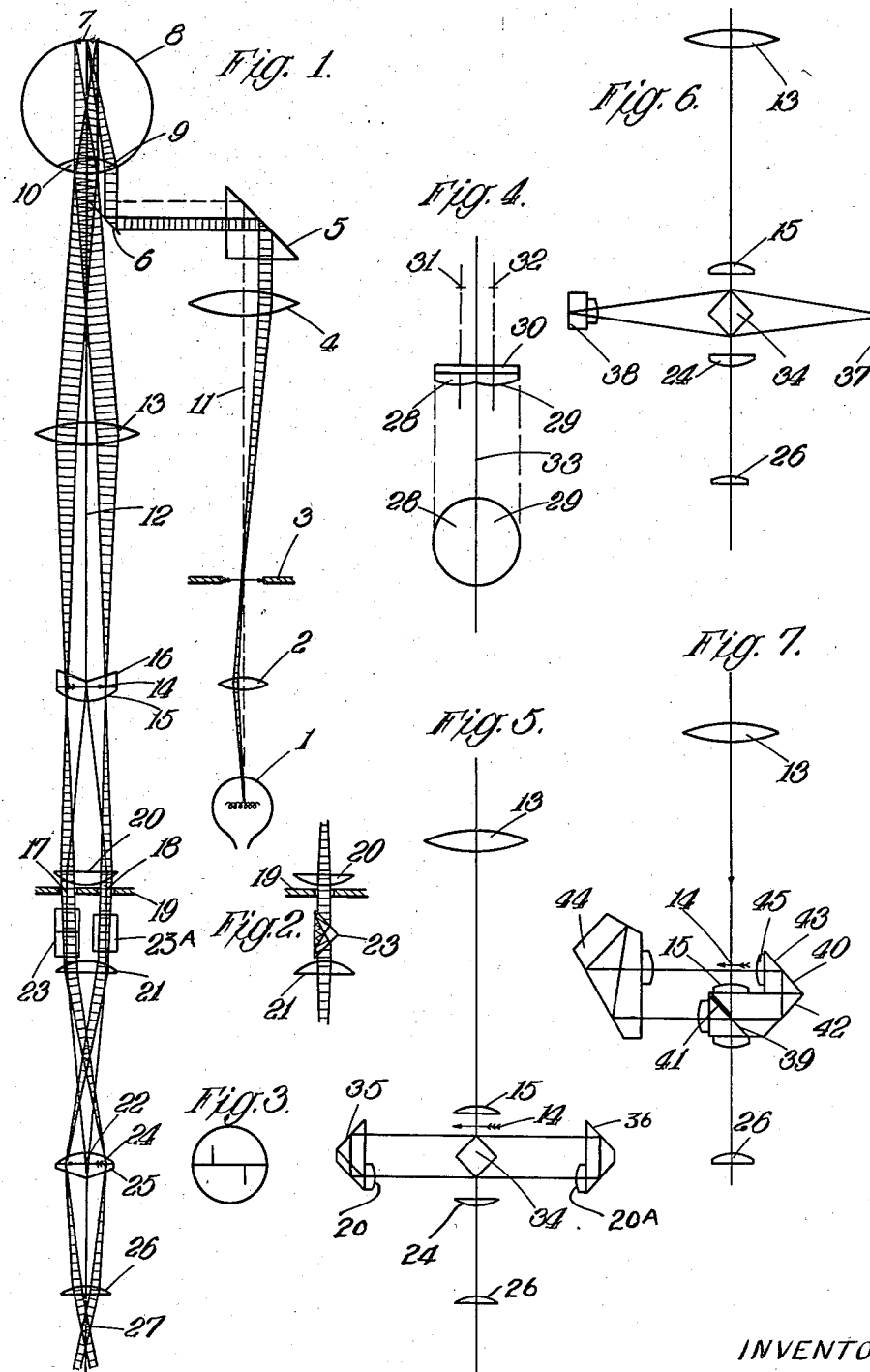
INVENTOR
Richard Edmund Reason Patented July 28, 1936

2,049,223

UNITED STATES PATENT OFFICE 2,049,223

APPARATUS FOR THE OBJECTIVE DETERMINATION OF THE REFRACTION OF THE EYE

Richard Edmund Reason, Leicester, England, assignor to Kapella Limited, Leicester, England Application January 14, 1935, Serial No. 1,708
In Great Britain January 18, 1934

6 Claims. (Cl. 88—20)

The present invention relates to apparatus of the kind suitable for measuring the refraction of the eye in any direction or for measuring directly the orientation of the axis of curvature of any cylindrical component of the eye.

Apparatus of this character has been described in the specifications of British Letters Patent No. 413,029, of July 12, 1934 and comprises an adjustable projecting system for directing light through a marginal area of the subject's pupil so as to form an image of a target upon the retina, which image henceforth will be called the "retinal image", and an observing system for viewing the retinal image along an axis inclined within the eye to that of the projecting system, the target comprising for the measurement of refraction, a line inclined to the plane containing these two axes and the rays emerging from the retinal image being divided into two beams reversed one with respect to the other, whereby any lack of focus of the retinal image results in displacement in opposite directions of the two beams.

The reversing device which it has been proposed to use comprises a prism mounted substantially at, and covering a portion of, an image of the retina. Owing to the considerable axial length of the prism, however, it is difficult to obtain a well-defined division of the field and in order to overcome this objection it has also been proposed to mount a bi-prism adjacent the reversing prism, but this in turn has the disadvantage that the exit pupils corresponding to the reversed and unreversed portions of the field are separated and light enters the observer's eye through two separated areas, thereby introducing as an error into the readings any aberrations, particularly that of the astigmatism, of the observer's eye.

It is therefore an object of the present invention to provide, in an arrangement of this kind, an observing system with which a well-defined division of the field may be obtained and in which light forming all portions of the observed image of the retina enters the observer's eye through a substantially continuous area of the observer's pupil.

According to the present invention there is provided optical apparatus for examining the eye, including a luminous target, a projecting system for focusing an image of a target upon the retina of a subject's eye through one area only of the pupil, and an observing system, for forming an intermediate image of the retina, which includes a light-deviating device disposed substantially at said intermediate image for dividing the image forming rays into a plurality of separate beams, reversing means for reversing at least one of said beams with respect to another, an objective system for forming, of said intermediate image, a succeeding image in which the reversed and unreversed beams are adjacent in one direction, and a light-deviating device disposed substantially at said succeeding image for directing said reversed and unreversed beams so that on emergence from the apparatus they can pass through a substantially continuous area of an observer's pupil.

The invention will now be described with reference to the accompanying diagrammatic drawing, in which Figure 1 shows, in plan view, a projecting system for forming an image of a target on the retina of a subject's eye, and an observing system arranged in accordance with the present invention for viewing the retinal image, Figure 2 shows, in elevation, a portion of the observing system of Figure 1, Figure 3 shows one form of image seen with the aid of the observing system of Figure 1, Figure 4 shows a device which may be used in place of the device 16 and Figures 5 to 7 show alternative arrangements of optical elements any one of which may be used in place of the elements 13 to 26 of Figure 1.

Referring now to Figure 1, the apparatus shown comprises a projecting system comprising members 1 to 11 inclusive and an observing system comprising members 7, 10 and 12 to 27 inclusive. The projecting system comprises a lamp 1 from which light is condensed by a lens 2 upon a slit or target 3 which is disposed with its length in the plane of the paper. An image of the target 3 is formed, by means of a lens 4 and reflectors 5 and 6, at a position 7 upon the retina 8 of a subject's eye, the light passing through a marginal, or at least decentred or eccentric, area 9 of the eye-lens 10. The target 3 is mounted for movement along the axis 11 of the projecting system, whereby the image 7 may be accurately focused upon the retina 8. If desired, however, the same effect may be produced by moving some other member such as the lens 4.

Assuming the eye-lens 10 to be spherical, then when the image 7 is accurately in focus on the retina, its centre lies on the optic axis 12 of the eye-lens 10, but if the image is focused, say, a little behind the retina 8, the image 7 actually on the retina is displaced appreciably in its own length and is also out of focus, but to a negligible extent. On the optic axis 12 is disposed a first objective 13 positioned so as to form, of the retinal image 7, an intermediate image 14. In the plane of the latter is disposed a first field lens 15 with which is combined a bi-prism 16 adapted to divide the image-forming rays into two beams which pass through apertures 17 and 18 in an obturator 19. A second objective of two components 20 and 21 is disposed so as to form a succeeding, recombined image 22 of the intermediate image 14. The objective 13, in conjunction with the field lens 15 and bi-prism 16, forms two images of the subject's pupil, one on each of the apertures 17, 18, and the component 20 is preferably arranged with its principal focus in the plane of the intermediate image 14 so that parallel light passes between the components 20 and 21. In one of the parallel beams is disposed a reversing device such as a Dove prism 23 and in the other beam there may be disposed a parallel plate of glass 23A which serves simply to compensate for the change in the length of the light path introduced by the reversing device 23. The path of the light through the Dove prism 23 (in a plane perpendicular to the paper) is shown in Figure 2. In the plane of the succeeding, partially reversed image 22 is disposed a second field lens 24 with which is combined a bi-prism 25 and focused on the roof of the bi-prism 25 is an eye-lens 26. The function of the bi-prism 25 is to recombine the two beams which form the double image 22 so that they pass through the same area at 27 at which point the observer's eye is placed, and the glass plate 23A ensures that there is no axial separation of the pupils at 27. It will thus be appreciated that errors due to wide separations of the beams entering the observer's eye are substantially eliminated.

For measuring the orientation of the cylindrical axis of the subject's eye, the light must enter the eye through a small area contained substantially in the plane containing the axis of the eye and the image of the target, and for measuring the refraction this area must be contained in an axial plane inclined preferably at right angles to said target image. Therefore, as arranged in Figure 1 the apparatus is suitable for determining the axis of astigmatism and functions in the following way:—

If the retinal image 7 is accurately in focus on the retina then, as mentioned previously, its centre must lie on the axis 12 of the observing system. If the power of the eye is now reduced, the focused target-image would be behind the retina and the image 7 is displaced longitudinally, that is to say, in its own length, if now the instrument is rotated around the eye, changes in power of a spherical eye will displace the retinal image 7 longitudinally only, but if the eye-lens 10 has a cylindrical component, then when the instrument is rotated the image 7 will be displaced laterally as well as longitudinally, except when its length happens to coincide with, or is at right angles to, the axis of astigmatism. Now the slightest lateral changes in position of the image 7 can be detected, in a manner which will be described later, in the observing system, so that by finding the direction of no lateral displacement of the image 7 the instrument can be used to detect the presence of cylindrical power and to determine the orientation of its axis independently of the amount of such power.

In order to measure the refraction of the eye, the projecting system must be disposed so that the area through which light enters the eye-lens 10 is located on the subject's pupil 90° away from the position shown in Figure 1, with the target length parallel to the paper. In this case if the focused image of the target 3 is formed behind the retina 8, the image 7 is displaced laterally, that is to say, perpendicularly to the plane of the paper. The image at 14 is divided as before into two beams and owing to the presence of the Dove prism 23 in one of these beams, one of the two images at 22 moves up from the paper and the other down from the paper, so that there is formed at 22, and the observer sees, an image somewhat as shown in Figure 3, the two half-images being adjacent in one direction but separated in a perpendicular direction.

In order accurately to focus the target 3 upon the retina 8, the former is moved along the axis 11 until the two half-images seen in Figure 3 are once again in alignment.

It is to be noted that the division of the field of Figure 3 is produced by the apex of the bi-prism 16 which has no axial length, the division of the field is therefore very well-defined.

Preferably the eye-lens 26 is focused on the bi-prism 25 and in order to avoid the effect of small errors of alignment, the bi-prism 16 may be positioned so that its image formed by the objective 20, 21, is slightly nearer to the eye-lens than the prism 25.

The bi-prisms 16 and 25 serve to divide and recombine, respectively, the rays forming the two halves of the image 22 and these prisms may be replaced by equivalent light-deviating devices of either reflecting or refracting nature. A device equivalent to the prism 16 is shown in Figure 4 and comprises two equal segments 28 and 29 of similar plano-convex spherical lenses cemented for convenience to a plane parallel glass disc 30, the centres of curvature of segments 28 and 29 being at 31 and 32 respectively.

A similar device equivalent to the bi-prism 25 would have the centres of curvature of the segments on sides of the axis 33 opposite to those of the respective segments themselves.

In Figure 5 is shown a reflecting device for dividing the image-rays at 14 into two beams. 13 and 15 are, as in Figure 1, the first objective and field lens respectively; close to the field lens 15 is disposed a cube 34 having its side walls reflective. One half of the image 14 is reflected to a roof-prism 35 where it suffers three reflections and the other half to a right-angle prism 36 where it suffers two reflections, so that one beam is reversed with respect to the other. Both beams are focused by the second objective lenses 20 and 20A. At the intersection of the second pair of faces of the reflecting prism 34 and after being again reflected at this prism are recombined and directed into the observer's eye (placed behind eye-lens 27) along adjacent paths, so that the light passes through the observer's pupil over one continuous area.

In Figure 6 is shown an arrangement similar to that of Figure 5 with the exception that, after division, the two beams suffer only one and two reflections respectively, in devices 37 and 38, 37 being a plano-convex lens with its plane face reflective and 38 being a plano-convex lens combined with a right-angle prism.

In the arrangement shown in Figure 7, one half of the rays forming the image 14 passes through a comparatively non-reflective area 39 of a light dividing prism 40, whilst the other half is reflected, in turn, at the upper surface of a double-sided mirror 41, the internal reflective surfaces 42 and 43 of the prism 40, at three surfaces (as shown) of the prism 44 and finally at the lower surface of the mirror 41. The reflected image thus is reversed with respect to the original, non-reflected image with which it is recombined. The area 39 may be made slightly reflective in order to compensate for the loss in intensity of the reflected beam due to its many reflections.

It will be apparent that the dividing devices, whether reflective or refractive, and the reversing device, may be designed to separate the image-forming rays into more than two beams and to reverse some parts of the image but not others, so that the observer sees a line of several segments which are in alignment when the target is in focus on the retina, but some of which are displaced (in one direction) with respect to others when the target is out of focus.

A reflecting divider may be used at the first image 14 and a refracting recombining system at the second image 22 or vice versa.

I claim:—

1. Optical apparatus for examining the eye, comprising a luminous target, a projecting system for focusing an image of the target upon the retina of a subject's eye through an eccentric area of the eye-lens, and an observing system for viewing the retinal image substantially through the centre of the eye-lens including an objective system for forming an intermediate image of said retinal image, means located substantially at said intermediate image for dividing the image into at least two parts with a common boundary and for directing the light passing through the two said parts into two separate beams, means for forming with the beams a second image of which one said part is reversed with respect to the other and rejoined thereto at their common boundary, and means located substantially at said second image for directing the light passing through the two said parts thereof so that it can pass successively through an eye-lens and through a substantially continuous area of an observer's pupil.

2. Optical apparatus for examining the eye, comprising a luminous target, a projecting system for focusing an image of the target upon the retina of a subject's eye through an eccentric area of the eye-lens, and an observing system for viewing the retinal image substantially through the centre of the eye-lens including an objective system for forming an intermediate image of said retinal image, means located substantially at said intermediate image for dividing the image into at least two parts with a common boundary and for directing the light passing through the two said parts into two separate beams, the means being of small axial length at the said common boundary, means for forming with the beams a second image of which one said part is reversed with respect to the other and rejoined thereto at their common boundary, and means located substantially at said second image for directing the light passing through the two said parts thereof so that it can pass successively through an eye-lens and through a substantially continuous area of an observer's pupil, the means being of small axial length at the said common boundary.

3. Optical apparatus for examining the eye, comprising a luminous target, a projecting system for focusing an image of the target upon the retina of a subject's eye through an eccentric area of the eye-lens, and an observing system for viewing the retinal image substantially through the centre of the eye-lens including an objective system for forming an intermediate image of said retinal image, a biprism located substantially at said intermediate image for dividing the image into at least two parts with a common boundary and for directing the light passing through the two said parts into two separate beams, means for forming with the beams a second image of which one said part is reversed with respect to the other and rejoined thereto at their common boundary, and a biprism located substantially at said second image for directing the light passing through the two said parts thereof so that it can pass successively through an eye-lens and through a substantially continuous area of an observer's pupil.

4. Optical apparatus for examining the eye, comprising a luminous target, a projecting system for focusing an image of the target upon the retina of a subject's eye through an eccentric area of the eye-lens, and an observing system for viewing the retinal image substantially through the centre of the eye-lens including an objective system for forming an intermediate image of said retinal image, a pair of inclined mirrors located substantially at said intermediate image for dividing the image into at least two parts with a common boundary and for directing the light passing through the two said parts into two separate beams, means for forming with the beams a second image of which one said part is reversed with respect to the other and rejoined thereto at their common boundary, and a pair of inclined mirrors located substantially at said second image for directing the light passing through the two said parts thereof so that it can pass successively through an eye-lens and through a substantially continuous area of an observer's pupil.

5. Optical apparatus for examining the eye, comprising a luminous target, a projecting system for focusing an image of the target upon the retina of a subject's eye through an eccentric area of the eye-lens, and an observing system for viewing the retinal image substantially through the centre of the eye-lens including an objective system for forming an intermediate image of said retinal image, means including a field lens located substantially at said intermediate image for dividing the image into at least two parts with a common boundary and for directing the light passing through the two said parts into two separate beams, a reversing prism in one beam adjacent to an image of the pupil formed jointly by said field lens and objective system, and a second objective system, adapted to receive both beams, whereby is formed a second image of which one said part is reversed with respect to the other and rejoined thereto at their common boundary, and means including a field lens located substantially at said second image for directing the light passing through the two said parts thereof so that it can pass successively through an eye-lens and through a substantially continuous area of an observer's pupil.

6. Optical apparatus for examining the eye, comprising a luminous target, a projecting system for focusing an image of the target upon the retina of a subject's eye through an eccentric area of the eye-lens, and an observing system for viewing the retinal image substantially through the centre of the eye-lens including an objective system for forming an intermediate image of said retinal image, means including a field lens located substantially at said intermediate image for dividing the image into at least two parts with a common boundary and for directing the light passing through the two said parts into two separate beams, in one beam a reversing reflector and in each beam a second objective system, whereby is formed a second image in which one said part is reversed with respect to the other and rejoined thereto at their common boundary, and means located substantially at said second image for directing the light passing through the two said parts thereof so that it can pass successively through an eye-lens and through a substantially continuous area of an observer's pupil.

RICHARD EDMUND REASON.

CERTIFICATE OF CORRECTION.

Patent No. 2,049,223.　　　　　　　　　　　　　　　　　　July 28, 1936.

RICHARD EDMUND REASON.

It is hereby certified that error appears in the printed specification of the above numbered patent requiring correction as follows: Page 1, second column, line 24, after "device 16" insert the words and comma of Figure 1,; page 2, second column, line 54, for "20A. At" read 20A at; and that the said Letters Patent should be read with these corrections therein that the same may conform to the record of the case in the Patent Office.

Signed and sealed this 20th day of October, A. D. 1936.

Leslie Frazer (Seal)　　　　　　　　　　　　　　　　　　Acting Commissioner of Patents.